United States Patent [19]

Johansen

[11] Patent Number: 5,052,570
[45] Date of Patent: Oct. 1, 1991

[54] COMPOSTING BIN APPARATUS WITH U-SHAPED CONNECTING MEMBERS

[76] Inventor: Roderic Johansen, 20234 23rd Place NW., Seattle, Wash. 98177

[21] Appl. No.: 386,605

[22] Filed: Jul. 31, 1989

[51] Int. Cl.⁵ .......................... B65D 6/24; B65D 6/26
[52] U.S. Cl. .................................. 220/4.33; 220/4.08; 220/908; 71/9; 71/4.24; 71/683; 229/198.3
[58] Field of Search ............... 220/1 T, 4 E, 5 A, 5 R, 220/80; 71/9; 47/56; 217/3 BC; 229/4.5, 198.3

[56] References Cited

U.S. PATENT DOCUMENTS

| | | | |
|---|---|---|---|
| 129,517 | 7/1872 | Baugh et al. | |
| D. 258,409 | 3/1981 | Nattrass | 220/1 T |
| 1,125,822 | 1/1915 | Dodds | 220/5 R |
| 1,196,991 | 9/1916 | Smith | 220/80 |
| 1,429,220 | 9/1922 | Blanton | 220/5 R |
| 1,500,917 | 7/1924 | Bell | 220/5 R |
| 1,549,721 | 4/1925 | Kraft | 220/80 |
| 1,597,724 | 8/1926 | Cooke | |
| 1,651,317 | 11/1927 | Bell | 220/5 R |
| 1,852,281 | 4/1932 | Bell | 220/5 R |
| 1,991,746 | 2/1935 | Hiatt | 229/198.3 |
| 2,086,613 | 7/1937 | Graham | 229/4.5 |
| 2,143,436 | 1/1939 | Edgin et al. | 220/5 R |
| 2,656,969 | 10/1953 | Kvasnok et al. | 229/198.3 |
| 2,969,279 | 1/1961 | Pierson | |
| 3,291,437 | 12/1966 | Bowden | |
| 3,930,647 | 1/1976 | Berlemont | 220/5 A |
| 3,934,999 | 1/1976 | Meier | |
| 3,951,294 | 4/1976 | Wilson | 220/5 R |
| 4,121,710 | 10/1978 | Murphy | 229/4.5 |
| 4,125,394 | 11/1978 | Wilson | 71/9 |
| 4,211,033 | 7/1980 | Ringer | 220/5 R |
| 4,343,907 | 8/1982 | Graefe | |
| 4,664,282 | 5/1987 | Chan et al. | 220/80 |
| 4,683,674 | 8/1987 | Faul | 47/83 |
| 4,801,325 | 1/1989 | Graefe | |

Primary Examiner—Stephen Marcus
Assistant Examiner—S. Castellano
Attorney, Agent, or Firm—Robert M. Bellomy

[57] ABSTRACT

The present invention relates to composting bins assembled from at least one elongated sheet of semi-rigid, flexible material with a means for locking the near and far ends of the elongated sheet together while the near and far ends overlap to form the enclosed space for containing decomposing organic waste matter.

5 Claims, 2 Drawing Sheets

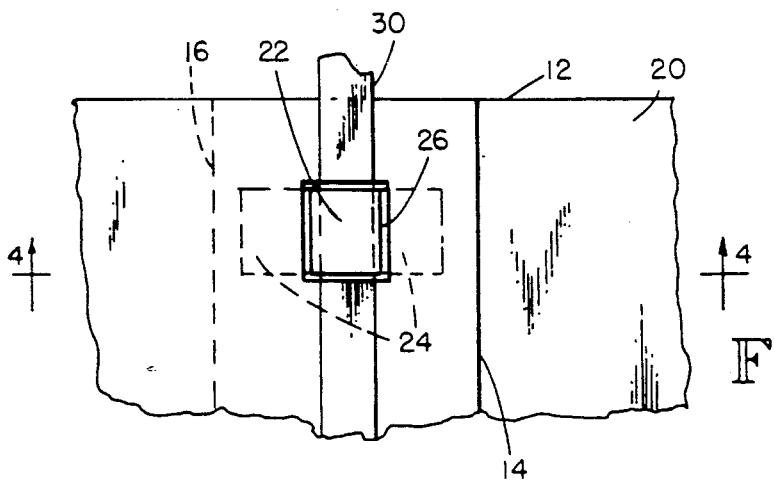
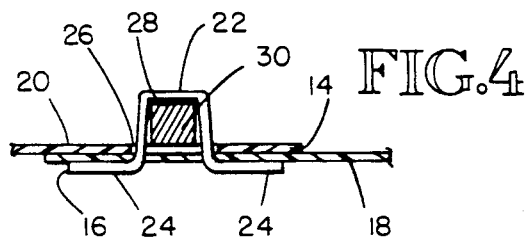
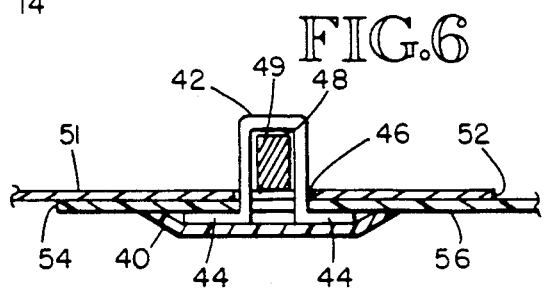
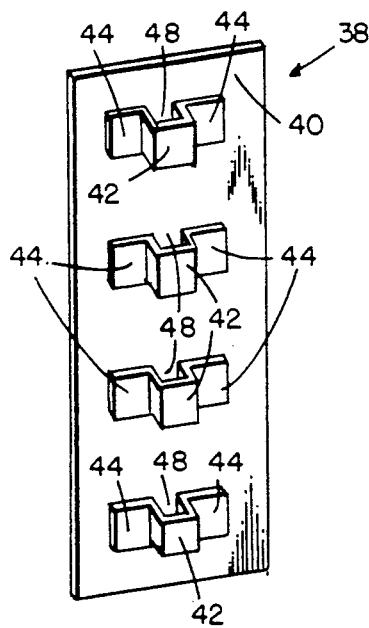
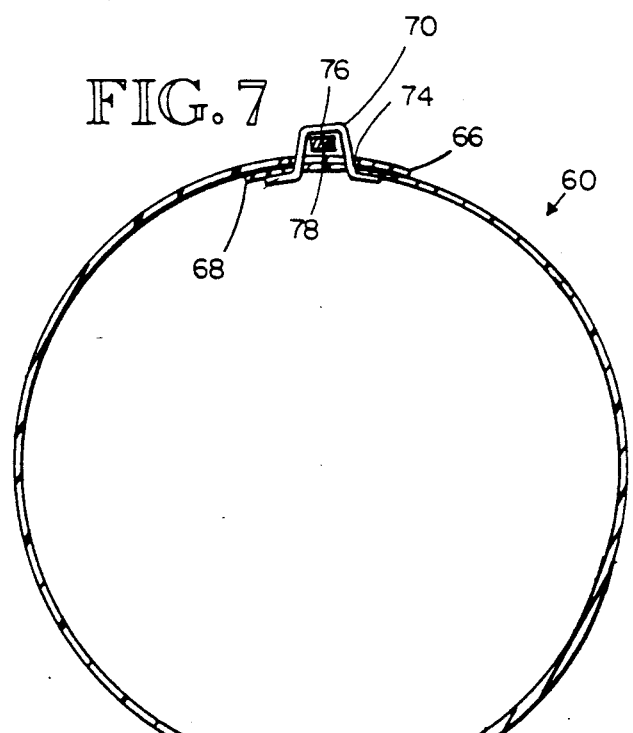

COMPOSTING BIN APPARATUS WITH U-SHAPED CONNECTING MEMBERS

TECHNICAL FIELD

The present invention relates to composting bins. More particularly, the present invention relates to a composting bin constructed using one or more elongated sheets of semi-rigid, flexible material, the ends of which are attached using a fastening means.

BACKGROUND OF THE INVENTION

Compost for use in gardening consists of decomposed waste organic material. A number of different devices have been and are still used to contain the waste material during the decomposition process. The earliest devices used were pits dug in the earth. Using a pit for decomposing materials has several shortcomings. First, there is the labor involved in digging the pit. In an urban environment, one must also be concerned about the appearance and odor of a pit containing decomposing waste material located in one's yard. Finally, the decomposition process requires ventilation and the waste material must be "turned" periodically to facilitate proper decomposition.

More recent above ground devices have been used as composting bins to contain the decomposing waste material. These devices also have a number of problems in achieving the desired result. Composting bins constructed of wire panels, as disclosed in Ringer (U.S. Pat. No. 4,211,033), present several shortcomings. First, the decomposition process requires both heat and moisture. The wire panels of Ringer allow both to escape. Further, the wire panels are needlessly heavy, complex to manufacture, and therefore, expensive.

Wilson (U.S. Pat. No. 3,951,294) resolves some of the problems of wire composting bins as represented by Ringer, but has other shortcomings. Wilson discloses a plurality of panels with ends that have interlocking beads and channels. The panels are interlocked in a circular manner to form the composting bin. The beads and channels of the panels in the Wilson apparatus would require special moldings in manufacture, increasing the cost of the apparatus. Also, the number of panels required to construct the Wilson apparatus reduce the ease and convenience of its assembly.

As illustrated by the present discussion, there are a number of desirable features for a composting bin apparatus. The bin should be lightweight, easy to manufacture and assemble, relatively inexpensive, and able to retain the heat and moisture resulting from the decomposition of the waste material. Further, it would be desirable for a composting bin to be transportable and collapsible for easy storage when not in use. To allow its use in different situations, one should be able to adjust the capacity of the bin.

Although the discussion herein relates to composting bins, it is not intended that the invention be limited to this situation. It will be obvious from the description that follows that the present invention will be useful in other applications with problems common to those described herein.

SUMMARY OF THE INVENTION

It is the object of the present invention to provide an apparatus to contain decomposing organic waste material to provide compost for gardens.

It is also the object of the present invention to provide an apparatus that is easy and relatively inexpensive to manufacture.

It is the further object of the present invention to provide an apparatus that is lightweight and easy to assemble.

It is another object of the present invention to provide an apparatus that will retain the heat and moisture generated decomposing waste material.

It is another object of the present invention to provide an apparatus with a capacity that easily can be adjusted.

It is another object of the present invention to provide an apparatus that can be easily disassembled and stored when not in use.

The present invention achieves these objectives and other objectives which will become apparent from the description that follows, by providing at least one elongated sheet of semi-rigid, flexible material with a means of fastening the two ends of the same sheet or the opposite ends of two or more sheets together to form an enclosed space in which to contain the decomposing waste material.

The fastening means generally involves a plurality of apertures through the elongated sheet(s) in proximity to one end and a plurality of u-shaped members attached to the elongated sheet(s) in proximity to the other end. The apertures and u-shaped members are arranged so that when the end of the sheet(s) containing the apertures overlaps u-shaped members attached to the opposite end, the apertures and the u-shaped members align and u-shaped members extend through the apertures, forming a plurality of bores that are substantially in line. An elongated structural member, such as a thin wooden or metal stake is then placed through the bores, thereby locking the two ends together. For stability of the resultant composting bin, the stake can be driven into the ground.

In alternate embodiments, there can be apertures at both ends of the elongated sheet(s) which align when one end overlaps the opposite end. After the ends overlap one another in this embodiment, the u-shaped members are then extended through both apertures forming essentially the same plurality of bores discussed above.

In another alternate embodiment, the u-shaped members are attached to a backing sheet, which in turn, is attached to one end of the elongated sheet(s). As with the above embodiments, the u-shaped members then extend through the apertures when one end of the elongated sheet(s) overlaps the other end.

Multiple elongated sheets may be used with any of the fastening means. An end of one sheet overlaps the opposite end of another sheet, aligning the apertures so that the u-shaped members can extend through them and form the bores. This is done with each sheet until an enclosed space is formed.

BRIEF DESCRIPTION OF THE DRAWINGS

FIG. 3 is an enlarged, partial side elevation view of a preferred embodiment as shown in FIG. 1, in accordance with the present invention.

FIG. 4 is a partial plan view of a preferred embodiment in accordance with the present invention, taken along lines 4—4 of FIG. 3.

FIG. 5 is a perspective view of an auxiliary structural member used in an alternative preferred embodiment in accordance with the present invention.

FIG. 6 is a partial plan view of an alternative preferred embodiment in accordance with the present invention.

FIG. 7 is a plan view of a second alternative preferred embodiment in accordance with the present invention.

DETAILED DESCRIPTION OF PREFERRED EMBODIMENTS

Figure 2:
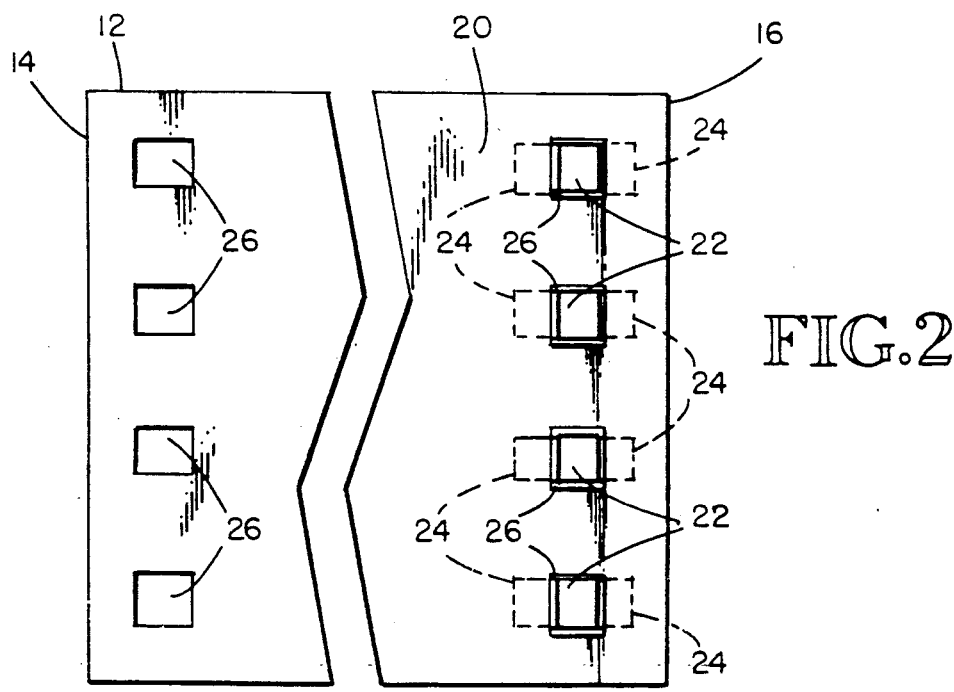
FIG. 2 is a partial, side elevation view of a preferred embodiment in accordance with the present invention.

A preferred embodiment in accordance with the present invention is shown in FIG.'s 1-4. In this embodiment, a composting bin 10 is constructed from a single elongated sheet 12 of semirigid, flexible material, such as plastic or treated cardboard. As shown in FIG. 2, there are a plurality of apertures 26 through the elongated sheet in proximity to its near end 14. In the embodiment illustrated in FIG.'s 1-4, there is a second plurality of apertures 26 through the elongated sheet in proximity to its far end 16. The apertures are located so that when the end of the sheet overlaps the far end, the apertures are as shown best in FIG.'s 1 and 4.

The apertures are of such a size and that u-shaped members 22 can be extended through the aperture. The u-shaped members are sufficiently high to extend t beyond two thicknesses of the elongated sheet when the ends of the sheet are overlapped as illustrated in FIG. 4. When the u-shaped members are extended through the apertures, a plurality of bores 28 are formed. In the embodiment illustrated in FIG. 1, the apertures are arranged so that the bores are substantially in line. Also shown in FIG. 4 are the tabs 24 which prevent the u-shaped members from passing completely through the apertures.

During manufacture, the u-shaped members may be extended through the apertures near the far end of the sheet and attached directly to the inner surface 18 of the elongated sheet by some means, such as an adhesive, rivets, or staples. Alternately, the members may be left as separate pieces which are pushed through the apertures when the bin is actually assembled.

Figure 1:
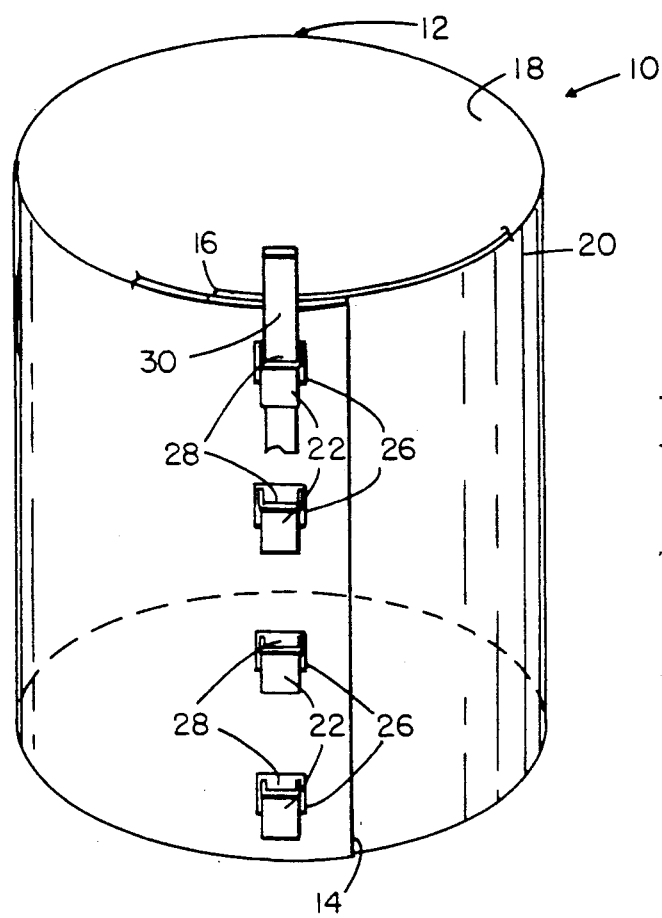
FIG. 1 is a perspective view of a preferred embodiment in accordance with the present invention.

To assemble the composting bin, one takes the elongated sheet and wraps it around so that the near end is overlapping the far end and the outer surface 20 is on the outside of the resulting structure as shown in FIG. 1. If the u-shaped members have already been attached to the sheet, the near end is moved until the apertures are aligned with the attached u-shaped members and then the members are extended through the apertures through the near end of the sheet, forming the plurality of bores. If the u-shaped members have not been previously attached, the two ends of the elongated sheet are moved until the two pluralities of apertures are aligned and then the u-shaped members are extended through both apertures to form the plurality of bores as shown in FIG. 1.

Once the bores have been formed, the assembler takes an elongated structural member, such as a wooden stake or a metal rod, that is both sufficiently narrow and long to pass through all of the bores simultaneously. When the elongated structural member is passed through the bores, it locks the two ends together and forms the enclosed space of the composting bin. After the elongated member has been passed through the bores, its sharpened forward end may be driven into the ground to enhance the stability of the composting bin. At this point, the organic waste material can be placed into the bin.

An alternative embodiment in accordance with the present invention is illustrated in FIGS. 5 and 6. In this embodiment, the u-shaped members 42 are attached to a backing sheet 40. As shown in FIG. 5, the tabs 44 on the u-shaped members are attached directly to the backing sheet by some means, such as an adhesive, rivets, or staples, forming an auxiliary structural member 38. Backing sheet 40 is advantageously constructed of a substantially rigid material such as thick plastic.

Assembly of this embodiment is similar to the first embodiment discussed above. The auxiliary structural member may be attached to the inner surface 56 of an elongated sheet 51 during manufacture. This extends the u-shaped members through the apertures 46 near the far end 54 of the sheet. Alternately, the auxiliary structural member may be left as a separate piece until assembly. Regardless of the method utilized, the near end 52 of the sheet overlaps the far end and is moved until apertures are aligned and the u-shaped members can be extended through them. As discussed above and shown in FIG. 6, this forms a plurality of bores 48 that are in line. After the bores are formed, an elongated structural member 49 is passed through all of the bores simultaneously, locking the two ends of the elongated sheet together between backing sheet 40 and the elongated structural member, and may be driven into the ground.

This embodiment has several advantages in addition to the advantages present in the general invention. First, the auxiliary structural member allows for even quicker assembly of the composting bin than with the first embodiment, by reducing the number of pieces required for assembly and fixing all of the u-shaped members in the correct position so that one may take the auxiliary structural member and extend all of the u-shaped members through the apertures simultaneously. The auxiliary structural member can also provide greater structural integrity to the assembled composting bin.

A third alternative embodiment in accordance with the present invention is illustrated in FIG. 7. This embodiment allows the assembly of a composting bin with a greater storage capacity by using more than one elongated sheet. Although the embodiment illustrated in FIG. 7 uses two elongated sheets 60, any number of sheets could be used in assembly of a composting bin limited only by the desired size and the availability of space.

As with the other embodiments of the invention, there is a set of apertures 74 though each elongated sheet in proximity to the near end 66 of that sheet. In the embodiment illustrated in FIG. 7, there is also a set of apertures through each sheet in proximity to the far end 68 of that sheet. As with the other embodiments discussed, the u-shaped members 70 can be attached to each sheet during manufacture or left as separate pieces until assembly.

During assembly, instead of wrapping one sheet around on itself to overlap the two ends, the near end of one sheet overlaps the far end of a different sheet. When the apertures are aligned, the u-shaped members are extended through the apertures to form a set of bores 76 that are in line. An elongated structural member 78 then is passed through all of the bores in that particular set and can be driven into the ground. This assembly is repeated with additional elongated sheets until the desired size for the composting bin is achieved. When the two ends of the first and the last elongated sheets used are overlapped and locked together by an elongated structural member, the composting bin is assembled and ready to receive the organic waste material as shown in FIG. 7 for two elongated sheets.

The auxiliary structural member discussed in the second alternative embodiment could also be used with this embodiment. Also, since the composting bin is easily assembled and disassembled, if there was a desire to expand the capacity of an existing composting bin, such an expansion could be accomplished merely by purchasing the appropriate pieces and adding those pieces to an existing bin.

It can be seen from the above discussion that the present invention as represented by these and other embodiments, is lightweight, relatively inexpensive to manufacture, quick and easy to assemble, readily portable, easy to store, and adjustable for capacity. Also, the pieces of the unassembled or partially assembled composting bin can be rolled into an assembly compact enough to be placed into a relatively small box for sale. The present invention has possible applications in any area in which lightweight, inexpensive, easy-to-assemble, easy-to-transport temporary storage is needed, such as temporary waste containers at outdoor concerts and other large outdoor assemblies, or as temporary storage for produce in fields.

Other variations and embodiments of the present invention are contemplated. Those skilled in the art will readily appreciate such variations upon carefully reviewing the above disclosure. Therefore, the present invention is not to be limited by the above description, but is to be determined in the scope of the claims which follow.

What is claimed is:

1. A composting bin comprising:
   at least one elongated sheet of semi-rigid, flexible material with one near end, one far end, an inner surface and an outer surface;
   a plurality of U-shaped members, each U-shaped member having two leg sections, each leg section having one end connected to a closed end of said U-shaped member and another end extending towards an open end of said U-shaped member, each leg section further having a tab attached to it proximate said open end of said U-shaped member;
   a first plurality of apertures through said elongated sheet proximate said far end;
   a second plurality of apertures through said elongated sheet proximate said near end, said second plurality of apertures having sizes, shapes and locations so that when said near end overlaps said ar end, said apertures of said first plurality align with said apertures of said second plurality, so that one said U-shaped member will extend through one said overlapped, aligned aperture of said first plurality and corresponding aperture of said second plurality simultaneously while said U-shaped member tabs rest against said elongated sheet inner surface, substantially all said apertures being too small to allow said tabs to pass through;
   a plurality of bores formed by extending said U-shaped members through said first plurality apertures and said second plurality apertures after said near end has overlapped said far end and said apertures of said first and said second pluralities have been aligned, and with said bores are substantially aligned so that a single rod can pass through substantially all said bores simultaneously; and
   an elongated structural member with a cross-sectional area small enough to allow said elongated structural member to pass through substantially all said bores, said elongated structural member also being sufficiently long to enable it to extend substantially through all said bores simultaneously, and said elongated structural member having a forward end that is sharpened so that once said near and far ends have been overlapped and said bores have been formed, said elongated structural member can be passed through substantially all said bores and driven into the ground stabilizing said composting bin and locking said near and far ends together.

2. A composting bin as claimed in claim 1, wherein said plurality of U-shaped members have their tabs attached to a backing sheet in positions so that after said near and said far ends have overlapped and said apertures of said first and said second pluralities have been aligned, said backing sheet can be positioned so that said U-shaped members can be extended through said apertures of said first and said second pluralities simultaneously to form said plurality of bores while said U-shaped members are attached to said backing sheet.

3. A kit for constructing a composting bin comprising:
   at least one elongated sheet of semi-rigid, flexible material with one near end, one far end, an inner surface and an outer surface;
   a plurality of U-shaped members, each U-shaped member having two leg sections, each leg section having one end connected to a closed end of said U-shaped member and another end extending towards an open end of said U-shaped member, each leg section further having a tab attached to it proximate said open end of said U-shaped member;
   a first plurality of apertures through said elongated sheet proximate said far end;
   a second plurality of apertures through said elongated sheet proximate said near end, said second plurality of apertures having sizes, shapes and locations so that when said near end overlaps said far end, said apertures of said first plurality align with said apertures of said second plurality, so that one said U-shaped member will extend through one said overlapped, aligned aperture of said first plurality and corresponding aperture of said second plurality simultaneously while said U-shaped member tabs rest against said elongated sheet inner surface, substantially all said apertures being too small to allow said tabs to pass through;
   a plurality of bores formed by extending said U-shaped members through said first plurality apertures and said second plurality apertures after said near end has overlapped said far end and said apertures of said first and said second pluralities have been aligned, and with said bores are substantially aligned so that a single rod can pass through substantially all said bores simultaneously; and
   an elongated structural member with a cross-sectional area small enough to allow said elongated structural member to pass through substantially all said bores, said elongated structural member also being sufficiently long to enable it to extend substantially through all said bores simultaneously, and said elongated structural member having a forward end that is sharpened so that once said near and far ends have been overlapped and said bores have been formed, said elongated structural member can be passed through substantially all said bores and driven into the ground stabilizing said composting bin and locking said near and far ends together.

4. A kit for constructing a composting bin as claimed in claim 3, wherein said plurality of U-shaped members have their tabs attached to a backing sheet in positions so that after said near and said far ends have overlapped and said apertures of said first and said second pluralities have been aligned, said backing sheet can be positioned so that said U-shaped members can be extended through said apertures of said first and said second pluralities simultaneously to form said plurality of bores while said U-shaped members are attached to said backing sheet.

5. A composting bin comprising:
- at least two elongated sheets of semi-rigid, flexible material, each sheet with a near end, a far end, an inner surface, and an outer surface;
- a plurality of U-shaped members, each U-shaped member having two leg sections, each leg section having one end connected to a closed end of said U-shaped member and another end extending towards an open end of said U-shaped member, each leg section further having a tab attached to it proximate said open end of said U-shaped member;
- a plurality of sets of first apertures, one said set of first apertures through each said elongated sheet in proximate to said elongated sheet far end;
- a plurality of sets of second apertures, one said set of second apertures through each said elongated sheet proximate to said elongated sheet near end, each said set of second apertures having sizes, shapes and locations so that when one said elongated sheet near end overlaps with said far end of another said elongated sheet, one said set of said first apertures aligns with one said set of said second apertures so that one said U-shaped member will extend through one said overlapped, aligned first aperture and second aperture simultaneously while said U-shaped member tabs rest against said inner surface of each said elongated sheet proximate said first aperture, substantially all said first and second apertures being too small to allow said tabs to pass through;
- a plurality of sets of bores, each said set of bores formed by extending said U-shaped members through one said set of first apertures and one said set of second apertures after said near end of one said elongated sheet has overlapped said far end of another said elongated sheet and said set of said first apertures in said set of second apertures have been aligned, and with said bores of each said set substantially aligned so that a single rod can pass substantially through all said bores of a single said set, where said sets of bores are created until said near end of each said elongated sheet overlaps said far end of another said elongated sheet and an enclosed space is created; and
- a plurality of structural members, each structural member having a cross-sectioned area small enough to allow said elongated structural member to pass through substantially all said bores of one said set of said bores, said elongated structural member also being sufficiently long to enable it to extend substantially through all said bores simultaneously of one said set of bores, and each said elongated structural member having a forward end that is sharpened so that once said near end of one said elongated sheet and said far end of another said elongated sheet have been overlapped and one said set of said bores has been formed, one said elongated structural member can be passed through substantially all said bores of one said set of said bores and driven into the ground stabilizing said composting bin and locking said near end of one said sheet and said far end of another said sheet together, there is one said elongated structural member for each said set of said bores so that said near end of each elongated sheet is locked together with said far end of another said elongated sheet forming a closed space.

* * * * *